United States Patent Office 2,828,317
Patented Mar. 25, 1958

2,828,317
NEW DI-IMIDAZOLE DERIVATIVES AND PROCESS FOR THEIR MANUFACTURE

Adolf Emil Siegrist, Basel, and Franz Ackermann, Binningen, Switzerland, assignors to Ciba Limited, Basel, Switzerland, a Swiss firm No Drawing. Application August 25, 1955
Serial No. 530,608

Claims priority, application Switzerland August 27, 1954

10 Claims. (Cl. 260—309.2)

This invention provides new di-imidazole derivatives of the general formula

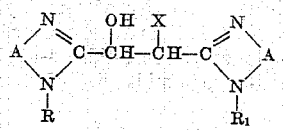

in which A represents an aromatic nucleus which may contain substituents and of which two vicinal carbon atoms are bound to the two imidazole-nitrogen atoms, R and $R_1$ represent hydrogen or the same or different substituents, and X represents hydrogen or a hydroxyl group, and salts of these derivatives. The residue A in the above formula may be mononuclear or polynuclear. For example, it may be a naphthylene or phenylene residue, which may contain as substituents halogen atoms or alkyl or alkoxy groups. Advantageously it represents an unsubstituted phenylene residue. R and $R_1$ are advantageously hydrogen atoms. Alternatively, they may be any desired residues, for example, of aromatic or heterocyclic character. They may be, more especially, aliphatic or araliphatic residues, and preferably alkyl or oxyalkyl residues of low molecular weight, such as methyl or oxyethyl groups. The salts of the new compounds may be those of any inorganic or organic acids, for example sulphuric acid, hydrochloric acid, nitric acid, formic acid or acetic acid.

The invention provides a process for making the above new compounds, wherein an appropriate aromatic ortho-diamine or salt thereof is reacted, if desired in the presence of a catalyst, with malic acid or tartaric acid or a functional derivative of either of these acids, and, if desired, the di-imidazole so obtained is reacted with an alkylating, oxyalkylating or aralkylating agent.

As aromatic ortho-diamines suitable for the present process there are to be understood those in which one amino group is primary and the other amino group is primary or secondary. Such amines are, for example, ortho-phenylene diamine, 1:2-naphthylene diamine, and also isopropyl-ortho-phenylene diamine, 1-methoxy-3:4-diaminobenzene, 1-amino-2-monomethyl-amino-benzene or 1-chloro-3:4-diaminobenzene. There is preferably used ortho-phenylene diamine.

As derivatives of malic acid or of tartaric acid, which may be used for the condensation instead of the free acid, there may be mentioned, more especially, their esters with aliphatic alcohols of low molecular weight.

The components are advantageously reacted together by heating them in the presence of an inert solvent, if desired, with the addition of a catalyst, at a moderately high temperature, and advantageously in an inert gas, for example, in a current of nitrogen. As solvents there are used, more especially, moderately concentrated aqueous mineral acids. There may also be used organic solvents, such as toluene or xylene. Temperatures within the range of 80° C. to 140° C. are advantageous for carrying out the condensation. The reaction is preferably carried out in such manner that the acylation of the amine and ring closure to form the imidazole rings take place in one operation. Alternatively, the diamine may be acylated in one amino group, the acylation product isolated, and ring closure brought about in a second stage.

An alternative process consists in condensing an aromatic ortho-nitro-amine, instead of an aromatic ortho-diamine, with the malic acid, tartaric acid or functional derivative thereof, reducing the nitro group in known manner to an amino group, and then forming the di-imidazole by ring closure.

The alkylation or aralkylation of the di-imidazoles, which may be carried out, if desired, can be conducted in the usual manner, for example, by treatment with an alkyl, oxyalkyl or aralkyl halide, such as benzyl chloride, advantageously with the addition of an acid-binding agent. For alkylation there may also be used dialkyl sulphates, such as dimethyl sulphate.

The new compounds and their salts are colourless or slightly coloured substances that crystallize well, and are rather sparingly soluble in most solvents. They are useful as intermediate products for making textile assistants, especially optical brightening agents or dyestuffs. The compounds themselves act as oxidation inhibitors, and are therefore useful as agents for protecting cellulose esters, especially cellulose acetate silk, against damage by oxidation.

The following examples illustrate the invention, the parts being by weight unless otherwise stated, and the relationship of parts by weight to parts by volume being the same as that of the kilogram to the litre:

Example 1

432 parts of ortho-phenylene diamine and subsequently 268 parts of d:1-malic acid are introduced into 2000 parts of sulphuric acid of 40 percent strength with the exclusion of air, while stirring. The temperature is then raised to the gentle boil in the course of two hours, and the clear solution is stirred for 18–48 hours at 105–110° C. with the exclusion of air. The reaction mixture is then cooled to 10–15° C. and stirred for a few hours in the cold. The precipitated crystalline mass is filtered off, washed neutral to Congo with cold water and dried. The condensation product so obtained has the formula

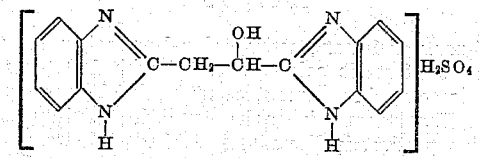

and is slightly yellowish to greenish coloured powder, which is sparingly soluble in water and the usual organic solvents. It dissolves in concentrated sulphuric acid with a bright blue coloration.

The free base can be obtained by mixing a dilute sulphuric acid solution of the condensation product with an alkali, for example, with ammonia or an aqueous solution of sodium hydroxide, filtering off the precipitated condensation product, washing it neutral with water and drying it. It is an almost colourless powder and is clearly soluble in an alcoholic solution of sodium hydroxide.

The quantity of sulphuric acid of 40 percent strength may be increased or decreased, and more concentrated or more dilute sulphuric acid may be used.

By using in this example, instead of 2000 parts of sulphuric acid of 40 percent strength, 2400 parts of hydrochloric acid of 20 percent strength, the hydrochloride of the condensation product is obtained.

Derivatives of the condensation product are prepared as follows:

(a) 55.6 parts of α:β-di-[benzimidazyl-(2)]-monooxyethane are dissolved in a solution of 20 parts of sodium hydroxide in 600 parts of ethyl alcohol at 35–40° C., while stirring. 63 parts of dimethyl sulphate are added dropwise to the solution in the course of 3 hours, and the whole is then stirred for a further 5 hours at 35–40° C. The resulting α:β-di[N-methyl-benzimidazyl-(2)]-mono-oxyethane is filtered off, washed with alcohol and water, and dried. It may be recrystallized from alcohol, and then melts at 205–206° C. It is in the form of colourless crystals which exhibit a strong bluish fluorescence in ultra-violet light.

(b) The procedure is the same as described under (a), except that 65 parts of benzyl chloride are used, instead of 63 parts of dimethyl sulphate. There is obtained α:β-di-[N-benzyl-benzimidazyl-(2)-]-mono-oxyethane, which melts at 192–193° C. and has similar properties.

(c) 113 parts of α:β-di[benzimidazyl-(2)]-mono-oxyethane monosulphate are introduced, while stirring well, into a solution of 60 parts of sodium hydroxide in 600 parts of ethyl alcohol at 35–40° C. 37 parts of ethylene chlorhydrin are then added in the course of 2 hours, and thereafter the mixture is stirred for a further 3 hours at 35–40° C. The mixture is then poured into cold water, and the precipitated product is filtered off, washed with water, dried, and recrystallized from aqueous alcohol. The α-[benzimidazyl-(2)]-β-[N-hydroxyethyl-benzimidazyl-(2)]-mono-oxyethane so obtained is a bright powder which exhibits a bluish fluorescence in ultra-violet light.

*Example 2*

The procedure is the same as described in the first and second paragraph of Example 1, except that there is used, instead of 432 parts of ortho-phenylene diamine, an equivalent quantity of 5-chloro-1:2-diaminobenzene or 5-methyl-1:2-diaminobenzene or 5-methoxy-1:2-diaminobenzene. In this manner there is obtained α:β-di-[6-chlorobenzimidazyl-(2)]-mono-oxyethane or α:β-di-[6-methylbenzimidazyl-(2)]-mono-oxyethane or α:β-di-[6-methoxybenzimidazyl-(2)]-mono-oxyethane, or the monosulphates of these condensation products.

In order to convert them into derivatives thereof, the methods described under (a), (b) or (c) in Example 1 may be used.

*Example 3*

24.4 parts of 1-monomethylamino-2-aminobenzene and 13.4 parts of malic acid are heated with 200 parts of sulphuric acid of 50 percent strength for 36 hours under reflux. The mixture is cooled, and the resulting condensation product is filtered off, washed with water and dried. The product so obtained is the mono-sulphate of α:β-di-[N-methyl-benzimidazyl-(2)]-mono-oxyethane, and is a greenish yellow powder which dissolves in dilute sulphuric acid.

The free base can be obtained by mixing a sulphuric acid solution of the above product with ammonia. The free base is identical with the product described under (a) in Example 1.

*Example 4*

216 parts of ortho-phenylene diamine and subsequently 168 parts of tartaric acid are introduced into 1000 parts of sulphuric acid of 40 percent strength with the exclusion of air while stirring. The temperature is then raised to a gentle boil in the course of 2 hours, and the clear solution is stirred for 20–40 hours with the exclusion of air at 105–110° C. The reaction mixture is then cooled to 10–15° C. and stirred in the cold for a few hours. The precipitated crystalline mass is filtered off, washed neutral to Congo with cold water and dried. The resulting condensation product of the formula

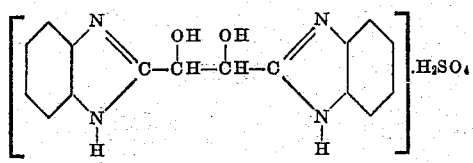

is a slightly greenish white crystalline powder, which is soluble in hot dilute sulphuric acid.

The free base can be obtained by mixing a dilute sulphuric acid solution of the product with an aqueous solution of ammonium hydroxide, and filtering off the precipitated condensation product, then washing it neutral with water and drying it. It is a white powder.

*Example 5*

The procedure is the same as described in Example 4, except that, instead of ortho-phenylene diamine, there is used an equivalent quantity of 5-methyl-1:2-diaminobenzene or 5-methoxy-1:2-diaminobenzene. There is obtained α:β-di-(6-methyl-benzimidazyl-(2)]-dioxyethane or α:β-di-[6-methoxybenimidazyl-(2)]-dioxylethane, respectively.

*Example 6*

108 parts of ortho-phenylene diamine, 163 parts of diethyltartrate and 500 parts of chlorobenzene are heated for 24 hours under reflux, during which the alcohol formed and the water formed are continuously distilled off. After cooling the mixture, the condensation product is filtered off, washed with chlorobenzene and alcohol, and dried. It is identical with the product obtained as described in Example 4.

*Example 7*

Cellulose acetate silk fabric which has been dyed a blue shade with 0.5 percent of 1,1-di-(mono-methylamino)-anthraquinone is treated for 30 minutes, at liquor ratio of 1:30 and at 50–60° C., in a bath containing per liter 1.5 grams of formic acid and 5 grams of the condensation product obtained according to Example 4. After being rinsed and dried, the fabric has a much greater resistance to gas fading than untreated material.

What is claimed is:

1. A compound selected from the group consisting of di-imidazole derivatives and their salts, which di-imidazole derivatives correspond to the formula

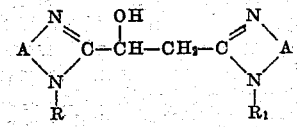

in which A represents a monocyclic nucleus of the benzene series of which two vicinal carbon atoms are bound to the two imidazole-nitrogen atoms, and R and R₁ each represents a member selected from the group consisting of hydrogen, low molecular alkyl and hydroxyalkyl groups and a benzyl radical.

2. A di-imidazole derivative which in its free base state corresponds to the formula

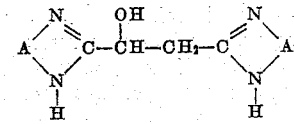

in which A represents a monocyclic nucleus of the benzene series of which two vicinal carbon atoms are bound to the two imidazole-nitrogen atoms.

3. α:β-Di-[benzimidazyl-(2)]-mono-hydroxyethane.

4. The monosulphate of α:β-di-[benzimidazyl-(2)]-mono-hydroxyethane.

5. α:β-Di-[N-methyl-benzimidazyl-(2)]-mono-hydroxyethane.

6. α:β-Di-[N-benzyl-benzimidazyl - (2)] - mono-hydroxyethane.

7. α-[Benzimidazyl - (2)] - β-[N-hydroxyethylbenzimidazyl-(2)]-mono-hydroxyethane.

8. A process for the manufacture of a di-imidazole derivative of the formula

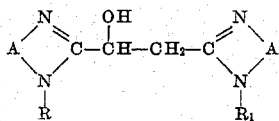

in which A represents a monocyclic nucleus of the benzene series of which two vicinal carbon atoms are bound to the two imidazole-nitrogen atoms, and R and $R_1$ each represents a member selected from the group consisting of hydrogen, low molecular alkyl and hydroxyalkyl groups and a benzyl radical, which comprises condensing by heating in an inert solvent an aromatic ortho-diamine in which the sum of the hydrogen atoms connected with both nitrogen atoms amounts to at least three with a member selected from the group consisting of malic acid and alkyl esters of malic acid.

9. A process for the manufacture of a di-imidazole derivative of the formula

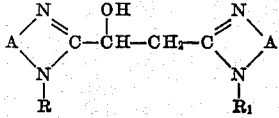

in which A represents a monocyclic nucleus of the benzene series of which two vicinal carbon atoms are bound to the two imidazole-nitrogen atoms, and R and $R_1$ each represents a member selected from the group consisting of hydrogen, low molecular alkyl and hydroxyalkyl groups and a benzyl radical, which comprises condensing by heating in an inert solvent ortho-phenylene-diamine with malic acid in the presence of a moderately concentrated aqueous mineral acid.

10. A process for the manufacture of α:β-di-[benzimidazyl-(2)]-mono-hydroxyethane, which comprises condensing by heating ortho-phenylene-diamine with malic acid in the presence of aqueous sulfuric acid.

References Cited in the file of this patent
UNITED STATES PATENTS

| | | |
|---|---|---|
| 2,488,094 | Graenacher et al. | Nov. 15, 1942 |
| 2,515,173 | Ackermann et al. | July 18, 1950 |

OTHER REFERENCES

Tuot et al.: Chem. Abst., vol. 42, p. 5835h (1948).

UNITED STATES PATENT OFFICE

CERTIFICATE OF CORRECTION

Patent No. 2,828,317             March 25, 1958

Adolf Emil Siegrist, et al.

It is hereby certified that error appears in the printed specification of the above numbered patent requiring correction and that the said Letters Patent should read as corrected below.

Column 3, lines 9 and 21, after "di" insert a hyphen in each occurrence; column 4, line 24, for "-methoxybenimidazyl-" read -- -methoxybenzimidazyl- --; same line, for "-dioxylethane," read -- -dioxyethane, --.

Signed and sealed this 22nd day of July 1958.

(SEAL)

Attest:
KARL H. AXLINE

Attesting Officer

ROBERT C. WATSON
Commissioner of Patents